354-289.1 SH
4/7/87 XR RE 32,391

United States Patent [19]

Berg

[11] E Patent Number: Re. 32,391

[45] Reissued Date of Patent: Apr. 7, 1987

[54] WARNING INDICATOR FOR A CAMERA

[76] Inventor: Floyd L. Berg, 24391 Wagon Wheel La., Lake Elsinore, Calif. 92330

[21] Appl. No.: 629,687

[22] Filed: Jul. 11, 1984

Related U.S. Patent Documents

Reissue of:

[64] Patent No.: 4,340,291
Issued: Jul. 20, 1982
Appl. No.: 93,307
Filed: Nov. 13, 1979

[51] Int. Cl.[4] ..... G03B 1/00; G03B 17/20

[52] U.S. Cl. ..... 354/215; 354/289.1

[58] Field of Search ..... 354/207, 212, 215, 217, 354/218, 289.1, 173.1, 173.11, 213; 352/171

[56] References Cited

U.S. PATENT DOCUMENTS

| | | | |
|---|---|---|---|
| 1,321,868 | 11/1919 | Weiss | 354/207 |
| 1,828,630 | 10/1931 | Underwood | 354/207 |
| 2,289,800 | 7/1942 | Nagel | 354/207 |
| 2,530,510 | 11/1950 | Crumrine | 354/217 X |
| 2,750,858 | 6/1956 | Marvin et al. | 354/207 |
| 3,688,668 | 9/1972 | Ort | 354/215 X |
| 4,021,828 | 5/1977 | Iura et al. | 354/289 X |
| 4,174,888 | 11/1979 | Hunn et al. | 354/218 X |

FOREIGN PATENT DOCUMENTS

| | | | |
|---|---|---|---|
| 890042 | 2/1962 | United Kingdom | 354/215 |

*Primary Examiner*—William B. Perkey

[57] ABSTRACT

A camera having a recess for receiving a roll of film and a take-up mechanism for advancing the film, the film having registration holes along the edges thereof, is provided with a sprocketed wheel for engagement with the registration holes, the wheel advancing when the film is advanced by the take-up mechanism. The wheel is coupled to a mechanical flag, in one embodiment, and to an electronic indicator, in another embodiment, to warn the operator of the camera when the film is not advancing properly.

9 Claims, 6 Drawing Figures

WARNING INDICATOR FOR A CAMERA

Matter enclosed in heavy brackets [ ] appears in the original patent but forms no part of this reissue specification; matter printed in italics indicates the additions made by reissue.

My invention relates to a warning system for a camera and more particularly to a warning indicator for a photographic-type camera indicating the lack of proper advancement of the photographic film.

An objective of my invention is to provide an improved camera and more particularly to provide a camera with a warning indicator instructing the operator of the camera that its film has not properly advanced.

These objects are achieved as is now described. The body of a camera of the type having a recess for receiving a roll or canister of film and a mechanical take up mechanism for advancing the film is provided with a wheel which turns in response to advancement of the film. In the case of film having registration holes along its edges, this wheel may then be a sprocketed wheel, the sprockets of which engage the registration holes in the film. The wheel is coupled, in one embodiment, via a mechanical linkage and a release mechanism to a flag. The flag is disposed near the viewfinder and is visible in the viewfinder when the film is not properly advanced. Alternatively, the flag may be located elsewhere in the camera's body. Advancing the film causes the wheel to rotate, which, in turn, causes the flag to rotate or move to a non-obversable position, indicating that the film has advanced. The release mechanism is preferably coupled to the shutter release button, thereby causing the flag to return to its warning position after each picture is taken. Alternatively, the release mechanism may be coupled to the button which releases the camera's back (to provide acess to the camera's interior, especially to the film) whereby the flag will reappear when film is loaded into the camera.

In a second embodiment, the wheel is coupled to a detent which retracts when the film advances. The detent cooperates with the film advancement mechanism to permit only partial advancement of the film advancement lever if the detent has not retracted in response to movement of the film. In this embodiment the warning signal is provided to the camera operator in the event of improper film advancement by reason of the fact that the film advancement lever cannot be fully rotated.

In a third embodiment the wheel is coupled to a first switch in an electronic circuit. The circuit includes a flip-flop which is set by the operation of a second switch which is either arranged to operate when the shutter release button is depressed or when the camera's back is opened. The first switch resets the flip-flop. The flip-flop causes a warning indicator to light when set.

BRIEF DESCRIPTION OF THE DRAWINGS

The novel features believed to be characteristic of my invention are set forth in the appended claims. The invention itself, however, as well as a preferred mode of use and further objects and advantages thereof, will be best understood by reference to the following detailed description when read in conjunction with the accompanying drawings wherein:

DETAILED DESCRIPTION OF A FIRST EMBODIMENT

Figure 1:
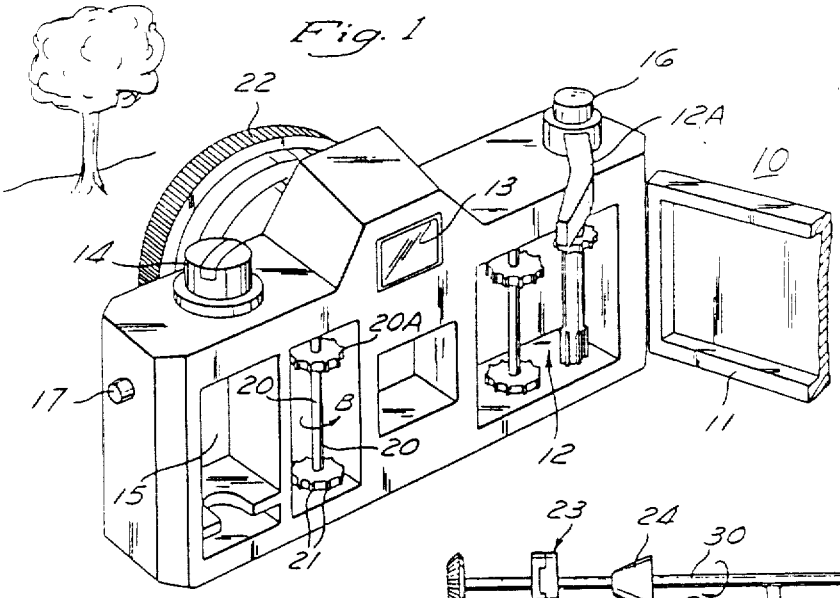
FIG. 1 is a rear perspective view of a camera.

FIG. 1 is a rear perspective view of a camera 10 with its back 11 open exposing a portion of the film advancement mechanism 12 and its receptical 15 for temporarily receiving a conventional roll or canister of film to view. Those skilled in the art will appreciate that the camera depicted in FIG. 1 is similar to the single lens reflex camera of the 35 mm variety, for example, which is commonly used by both amatuer and professional photographers. Thus the camera typically includes a viewfinder 13, a film advancement lever 12a (which may be considered part of the film advancement mechanism 12), a film rewind knob 14, a shutter release button 16 and a button 17 which permits the back 11 to be opened when operated. The camera's lens 22 is partially hidden from view and would commonly include a aperture control disposed thereon. As will be seen, my invention is not limited to a 35 mm single lens reflex camera unless otherwise set forth in the appended claims.

The camera of FIG. 1 differs in outward appearance from prior art cameras by the addition of a wheel assembly 20 which is adapted to rotate in the direction of arrow B when a roll or canister of film is placed in recepticle 15, threaded into mechanism 12 and advanced by the rotation of lever 12a. Wheel assembly 20 preferably includes two sprocked gears 20A having teeth 21 for engagement with the registration holes provided along the edges of film, especially 35 mm film.

Figure 2:
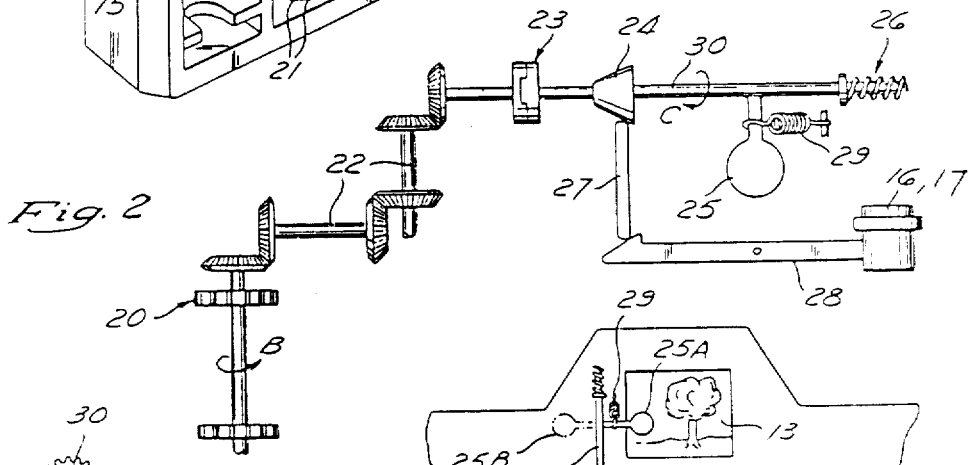
FIG. 2 is a simplified mechanical schematic of one embodiment of the warning system.

Turning now to FIG. 2, there is depicted a simplified mechanical schematic of one embodiment of my warning system. The wheel 20, which rotates as the film moves into a position for taking a picture, rotates a warning indicator 25 mounted on a rod 30 via a rear train 22. A friction clutch 23 may be provided between the indicator 25 and wheel 20 to permit slippage of the gear train if the warning indicator reaches its limit of travel and further rotation of wheel 20 is needed. Preferably, of course, the limit of travel of indicator 25 is reached when the film is normally advanced by selecting an appropriate gear ratio for gear train 22. A release mechanism 24 is also coupled between the indicator 25 and the wheel 20 mechanism 24 permits the warning indicator to return to its warning position in response to operation of link 27. Link 27 is coupled via a lever 28 to the shutter release button 16 (also shown in FIG. 1) *or alternatively to button 17*. A spring 26 urges the clutch 23 normally into engagement, but link 27 bears on mechanism 24 as button 16 is operated and thereby disengages clutch 23. Indicator 25 is then free to return to its warning position under the influence of a spring 29. When the film is advanced rotating wheel 20 in the direction of arrow B, the warning indicator 25 will rotate in the direction of arrow c against the action of spring 29.

Figure 4:
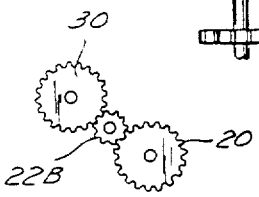
FIG. 4 is a section view through the mechanical embodiment of FIG. 3.
Figure 3:
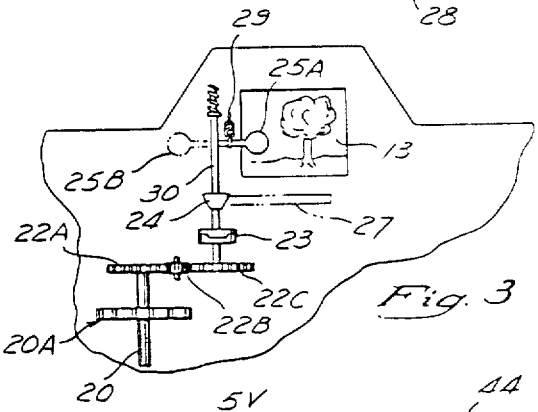
FIG. 3 is a partially cut away rear view of the camera including a mechanical embodiment of my warning system.

FIG. 3 depicts the viewfinder 13 of camera 10 and my warning system. In the viewfinder's window can be seen the scene depicted in front of camera 10 in FIG. 1. The warning indicator 25 appears in the viewfinder at numeral 25a. When wheel 20 is rotated in the direction of the arrow, indicator 25 will rotate to the position denoted by numeral 25b, which is out of the operators field of vision in viewfinder 13. The gear train 22 is depicted in the section view of FIG. 4. Idler gear 22b assures that wheel 20 and shaft 30 will both rotate in the same direction in this embodiment. In FIG. 3 only the upper sproket gear 20a is shown for ease of illustration.

In lieu of coupling link 27 to the shutter release button, some practicing the present invention may desire to couple link 27 to button 17 whereby the warning indicator would be reset only after the back 11 is opened to replace the film, for example. Also, in lieu of placing the warning indicator in the vicinity of the viewfinder 13, others may desire to place it elsewhere on the camera.

DETAILED DESCRIPTION OF A SECOND EMBODIMENT

Figure 5:
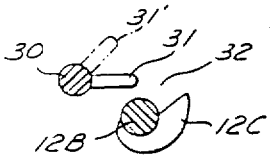
FIG. 5 is a section view through another embodiment of my warning system.
Figure 6:
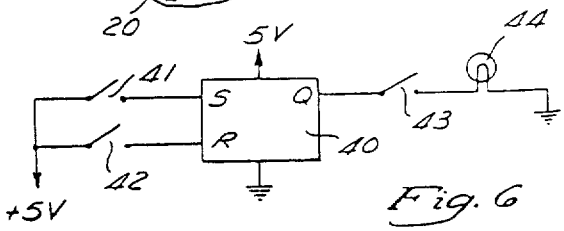
FIG. 6 is a logic diagram of an electronic embodiment of my warning system.

My second embodiment is similar to my first, except that instead of utilizing a separate warning indicator I utilize the existing lever 12a as a warning indicator. This embodiment is shown by FIGS. 1 and 5, FIG. 5 being a section view through the upper portion of the film advancement mechanism. Rod 30 includes a pin 31 and rod 30 is disposed adjacent to shaft 12b of mechanism 12a. Shaft 12b rotates counterclockwise in this embodiment when lever 12a is rotated in a counterclockwise fashion. Pin 31 is arranged to engage a detent 32 formed by member 12c on shaft 12b unless rod 30 is rotated moving pin 31 to the position 31' denoted by the dashed lines. Pin 31 on rod 30 moves in much the same fashion as indicator 25 and thus will move to position 31' upon proper advancement of the film. If the film has not properly advanced, full advancement of the film advancement mechanism lever 12a is not possible, thereby warning the operator of improper film advancement.

DETAILED DESCRIPTION OF A THIRD EMBODIMENT

My third embodiment utilizes primarily electronic circuit techniques to provide a warning indication. An electronic latch 40 is set by the closure of a switch 41 and reset by the closure of a switch 42. Switch 41 is preferably arranged to open when the back 11 is properly installed, however, it could also be arranged to operate in response to operation of the shutter release button 16. Switch 42 is preferably operated by rotation of wheel assembly 20. Latch 40 causes warning indicator 44 to light when in the set state, provided, of course, that a switch 43 in series with indicator 44 is closed (assuming switch 43 is even utilized). Switch 43 is preferably closed upon partial depression of release button 16, such as occurs when the camera operator attempts to take a picture. The warning indicator will then light if latch 40 is set indicating that the film has not properly advanced. Of course, switch 43 may be eliminated if desired, but switch 43 is preferably employed to reduce the consumption of electrical energy by the circuit of FIG. 5. The warning indicator 44 may be provided by a light emitting diodes positioned in the viewfinder, for example.

Having described my invention with respect to certain embodiments thereof, modification will now suggest itself to those skilled in the art. The invention itself is not to be limited to the embodiments described, except as set forth in the appended claims.

What is claimed is:

1. In a camera having a body [with a viewfinder], *a shutter release means,* a recess for temporarily receiving a roll of film and a take-up mechanism for advancing the film from said roll, the film having a plurality of registration holes situated along at least one edge thereof, [the improvement] *a warning system independent of said shutter release mechanism for warning an user of the camera of the improper threading of the film into said take-up mechanism, said warning mechanism* comprising a sprocket wheel assembly having sprockets for engagement with *the* registration holes in the film, said wheel assembly rotating in response to advancement of the film, [a flag moveably] *a rotatably mounted indicator* disposed in the [field of view of said viewfinder] *body* and means for moving said [flag out of the view of said viewfinder] *indicator* in response to the rotation of said assembly *when the film is properly threaded into said take-up mechanism, said indicator remaining stationary when said shutter release means is operated.*

2. The camera according to claim 1, wherein the body includes *a viewfinder and* a cover assembly for providing access to said recess, and said [flag] *indicator* is moved into a warning position in [the field of view of] the viewfinder in response to disengagement of the cover assembly.

3. In a camera having a body with a recess for temporarily receiving a roll of film, shutter release button and a take-up mechanism for advancing the film from said roll, the film having a plurality of registration holes situated along at least one edge thereof, the improvement comprising a sprocket wheel assembly having sprockets for engagement with registration holes in the film, said wheel assembly rotating in response to advancement of the film; a first switch operated in response to depression of the shutter release button; a second switch operated in response to rotation of said wheel assembly; a latch which is set in response to operation of the first switch and reset in response to the operation of said second switch and a warning indicator responsive to the state of said latch for providing a warning indication when said latch is set.

4. The camera according to claim 3 further including a third switch operated in response to partial depression of said release button and wherein said warning indicator provides a warning indication when said latch is set and said third switch is operated.

5. The camera according to claim 3 wherein said warning indicator emits visible light when providing a warning indication.

[6. In a camera having a body with a recess for temporarily receiving a roll of film and a take-up mechanism for advancing the film from said roll, the film having a plurality of registration holes situated along at least one edge thereof and the take-up mechanism including a film advancement lever, the improvement comprising a sprocket wheel assembly having sprockets for engagement with registration holes in the film, said wheel assembly rotating in response to advancement of the film and means coupled to the wheel assembly for warning the operator of camera non-advancement of said film, said warning means including means for inhibiting the normal movement of said lever in response to the non-rotation of said wheel.]

7. In a camera having a body with a viewfinder, *shutter release means,* means for temporarily receiving a roll of film and means for advancing the film from said roll, [the improvement] *a warning system for warning an*

*user of the camera of the improper threading of the film into said advancing means, said warning mechanism* comprising: an assembly provided independently of the film advancing means and operatively in contact with the film for movement in response to advancement of the film and for non-movement in response to non-movement of the film; a flag moveably disposed in a given position within the field of view of said viewfinder; and means for moving said flag out of [same] *said* given position to the movement of said assembly *when the film is properly threaded into said take-up mechanism, and for maintaining said flag in a fixed position when the shutter release means is operated.*

8. A camera according to [claims] *claim* 1, [3 or 6,] wherein said wheel assembly remains stationary in response to non-advancement of said film.

*9. A camera according to claim 3 wherein said wheel assembly remains stationary in response to non-advancement of said film.*

*10. In a camera having a case with a chamber for receiving a roll of film and a take-up mechanism for advancing the film frame by frame, the film having a plurality of registration holes along at least one edge thereof, a warning*

*system independent of the shutter release mechanism for warning an user of the camera of the improper threading of the film into said take-up mechanism, said warning mechanism comprising:*

*(a) an assembly having spockets adapted to engage the registration holes in the film, said assembly moving in response to advancement of the film;*

*(b) a window in said case;*

*(c) a rotational warning device disposed internally of said case and viewable through said window, said rotational warning device having two display conditions, a first display condition warning the operator of the camera of the non-advancement of the film and a second display condition advising the operator of the proper advancement of the film; and*

*(d) means independent of the shutter release mechanism operationally coupling said sprockets to said warning device for rotating said warning device from said first display condition in response to movement of said assembly when the film is properly threaded into said take-up mechanism, said warning device not rotating when said shutter release mechanism is operated.*

* * * * *